(12) United States Patent
Keller et al.

(10) Patent No.: US 7,221,831 B2
(45) Date of Patent: May 22, 2007

(54) MULTI-TUBE FIBER OPTIC CABLE AND SYSTEM AND METHOD FOR MAKING THE SAME

(75) Inventors: David Keller, Cary, NC (US); Randie Yoder, Garner, NC (US)

(73) Assignee: Nexans, Paris (FR)

( * ) Notice: Subject to any disclaimer, the term of this patent is extended or adjusted under 35 U.S.C. 154(b) by 0 days.

(21) Appl. No.: 11/071,600

(22) Filed: Mar. 3, 2005

(65) Prior Publication Data

US 2006/0198585 A1  Sep. 7, 2006

(51) Int. Cl.
*G02B 6/44* (2006.01)
(52) U.S. Cl. .................. 385/102; 385/100; 385/107; 385/108; 385/103; 385/106
(58) Field of Classification Search .............. 385/100, 385/102, 107, 108, 103, 106
See application file for complete search history.

(56) References Cited

U.S. PATENT DOCUMENTS

| | | | |
|---|---|---|---|
| 2,847,786 A * | 8/1958 | Day et al. ............... | 42/76.01 |
| 4,129,468 A * | 12/1978 | Knab ....................... | 385/114 |
| 4,230,395 A * | 10/1980 | Dean et al. .............. | 385/109 |
| 4,269,024 A | 5/1981 | Ashpole et al. ........... | 57/232 |
| 5,082,348 A | 1/1992 | Gartside, III et al. ...... | 6/44 |
| 6,249,629 B1 * | 6/2001 | Bringuier ................. | 385/113 |
| 6,751,383 B2 * | 6/2004 | Um et al. ................. | 385/112 |
| 2003/0118299 A1 | 6/2003 | Seddon et al. ........... | 385/111 |

FOREIGN PATENT DOCUMENTS

| | | |
|---|---|---|
| EP | 0846970 | 6/1998 |
| JP | 58198005 | 11/1983 |
| WO | WO02095474 | 11/2002 |

OTHER PUBLICATIONS

European Search Report- May 3, 2006.

* cited by examiner

*Primary Examiner*—Frank G. Font
*Assistant Examiner*—James P. Hughes
(74) *Attorney, Agent, or Firm*—Sofer & Haroun, LLP

(57) ABSTRACT

A multi-tube fiber optic cable maintains a plurality of fiber tubes, each fiber tube containing at least one optical fiber therein. The plurality of fiber tubes are disposed apart from a central axis of the cable. A plurality of strength members are disposed apart from a central axis of said cable. An outer jacket surrounds the plurality of fiber tubes and the plurality of strength members and is formed from a pressure extruded polymer. The plurality of fiber tubes and strength members are held in either one of an oscillated geometry or a helical geometry by the pressure extruded jacket.

4 Claims, 2 Drawing Sheets

MULTI-TUBE FIBER OPTIC CABLE AND SYSTEM AND METHOD FOR MAKING THE SAME

FIELD OF THE INVENTION

This invention relates to the field of multi-tube fiber optic cables. More specifically, the present invention relates to a particular configuration for multi-tube fiber optic cables and system and method for making the same.

BACKGROUND OF THE INVENTION

Fiber optical cables are widely known in the art as cables containing at least one optical fiber, but generally containing a plurality of optical fibers. Typical construction of optical fiber cables includes an external polymer jacket that is extruded over the fibers for protection. Within this extruded outer jacket, one or more tubes are contained therein, each of which having one or more optical fibers inside. Fiber optic cables with more than one tube are referred to as multi-tube optical fiber cables.

In addition to the optical fiber containing tubes, the cables also typically contain strength and protective elements in proximity to the tubes. These strength and protective elements may include glass or fiber reinforced plastic rods or other strength fibers such as flame resistant aramid fibers. Also, water swellable tapes or filaments can be added to prevent water ingress, avoiding water exposure to cable elements and downstream equipment.

Of the types of optical fiber cables available, single tube fiber optic cables are typically constructed with a single tube containing one or more fibers, where the tube is located in the center axis of the cable. However, this construction is limited in capacity, as it only has a single tube.

Multi-tube fiber optic cables increase the capacity by adding more tubes, however, there are a number of mechanical drawbacks that occur during both production of and installation of multi-tube cables.

When producing multi-tube fiber optic cables, it is necessary to stabilize the geometry of the tubes within the cable jacket so that the position of the tubes maintains a regular geometry along the length cable. This is necessary because if the tubes were simply allowed to freely float within the jacket it is possible that the length of one tube with respect to another tube or with respect to the jacket could begin to deviate, causing the fiber containing tubes to have a significantly different lengths than one another or the cable itself.

Also, if the tubes do not exhibit a regular geometry within the jacket, there can be problems if the cable experiences mechanical stresses from bending or temperature shrinkage. In severe cases, a reduction in the efficiency of the fibers in the tubes may result as the fibers may undergo widely varying physical stresses, particularly if one of the tubes is entirely located against the outer jacket. Furthermore, such irregular location of the tubes and supporting strength elements within the jacket may simply cause physical difficulties or deformities in the optical fibers leading to micro or macro bending of a individual optical fiber's light reflective channel (core) resulting in light (power) loss or attenuation.

To address this problem, prior art solutions in multi-tube fiber optic cables add an additional stranding step where tubes and strength members are stranded or cross bound with binding yarns or tapes so as to hold them in a particular regular geometry such as helical or oscillated arrangement. The regular oscillated or helical geometry of the tubes and strength elements improves the mechanical characteristics by ensuring equal and excess lengths of tubes relative to the cable jacket, allowing for better handling of mechanical stresses during spooling, uncoiling and installation.

However, this additional step is not only costly and time consuming but it also adds significant weight to the final cable. Stranding typically requires a geometrically correct grouping of elements, 4 or greater in number, to be stranded about a central element where less elements may be preferred.

Another method available to stabilize the location of the tubes within the cable jacket is to use pressure extrusion, where the outer jacket diameter is the same, but the inner side of the jacket is pressurized against the internal tubes and strength elements, thus filling in empty spaces and holding them in place. However, drawing tubes in a particular geometry while simultaneously pressure extruding the jacket is extremely difficult from a mechanical perspective because the pressure of the plastic from the extrusion head simply pushes the lighter tubes and strength elements out of any desired arrangement.

OBJECTS AND SUMMARY OF THE INVENTION

The present invention looks to overcome the drawbacks associated with the prior art and provide an economically produced multi-tube fiber optic cable where the fiber optic containing tubes have a regular non-linear geometry within the cable jacket without the need of a stranding step or an in line binding process.

To this end the present invention provides for a multi-tube fiber optic cable having a plurality of fiber tubes, each of which contain at least one optical fiber. The plurality of fiber tubes are disposed apart from a central axis of the cable.

A plurality of strength members are disposed apart from a central axis of the cables. An outer jacket surrounds the plurality of fiber tubes and the plurality of strength members, and is formed from a pressure extruded polymer. The plurality of fiber tubes and the plurality of cables are held in either one of an oscillated geometry and a helical geometry solely by the pressure extruded jacket.

Furthermore, the present invention provides a system for making a multi-tube fiber optic cable including a device having a plurality of rotating guide tubes within a rotating guide member. A pressure extrusion head has a pressure extrusion die exit and a formation chamber. The plurality of rotating guide tubes are configured to each guide one of a plurality of optical fiber containing fiber tubes or one of a plurality of strength members into the pressure extrusion head in either one of a helical geometry or an oscillated geometry.

The pressure extrusion head is configured to introduce a polymer onto the plurality of fiber tubes and the plurality of strength members in the formation chamber to form a pressure extruded jacket for the cable. The ends of the rotating guide tubes are in such proximity to the pressure extrusion head that the plurality of fiber tubes and the plurality of strength members maintain their helical or oscillated geometry solely supported by the polymer pressure extruded jacket as the cable exits the pressure extrusion die exit.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof may best be understood by reference to the following detailed description when read with the accompanying drawings in which:

DETAILED DESCRIPTION

Figure 1:
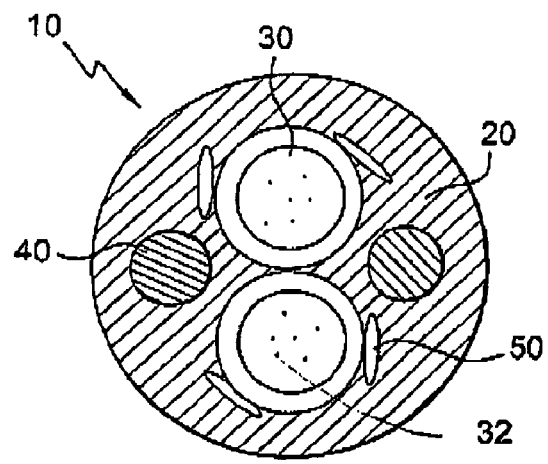
FIG. 1 is a cross section diagram of a multi-tube fiber optic cable in accordance with one embodiment of the present invention.

In one embodiment of the present invention, as illustrated in FIG. 1, a multi-tube fiber optical cable 10 includes a jacket 20, fiber optic tubes 30, strength elements 40 and protective filaments 50.

Jacket 20 is preferably constructed of a polymer that is pressure extruded over the elements of cable 10 as described in more detail below. Jacket 20 may be formed from different materials according to the particular application for cable 10. For example, jacket 20 may be made from polyethylene (PE) for use in outdoor cables 10. Alternatively, jacket 20 may be made from poly vinyl chloride (PVC) in cable 10 is for indoor use, so that cable 10 will meet necessary fire safety standards such as UL 910 (plenum rated) or UL 1666 (riser rated). It is understood that these materials are by way of example, and that any such polymer used in conjunction with a similar multi-tube optical fiber cable 10 is within the contemplation of the present invention.

In one embodiment of the present invention, as illustrated in FIG. 1, fiber tubes 30 are typical fiber optic containing tubes. Fiber tubes 30 contain at least one optical fiber 32 but typically contain a larger number of fibers. The fibers may be individually jacketed with their own polymer coating (tight buffer) or they may be simply contained within fiber tube 30 coated in UV acrylic coatings (loose tube arrangement). Any fiber tube 30 having at least one optical fiber within an outer coating is within the contemplation for use within the present invention.

Strength elements 40, illustrated in FIG. 1, are preferably glass or fiber reinforced plastic rods. Alternatively, strength elements 40 may be constructed of fiberglass or aramid or other such strength fibers. Strength rods may be incorporated, being a composite of plastics and strength fibers. Any similar strength fibers or rods (with or without water swellable "super absorbent" powders or coatings), typically used in fiber optic cables are within the contemplation of the present invention. Water swellable filaments 50, shown in FIG. 1, are may be positioned within outer jacket 50 in proximity to fiber tubes 30. These filaments 50 are contained within jacket 20 to protect against water ingress thus reducing water exposure.

As shown in FIG. 1, multi-tube fiber optic cable 10 maintains two fiber tubes 30 and two strength elements 40, with a number of water swellable filaments 50 located disposed in proximity to fiber tubes 30. Fiber tubes 30 and strength elements 40 are all located apart from the central axis.

In another embodiment of the present invention, a second multi-tube fiber optic cable 100 maintains three fiber tubes 30 and three strength elements 40, with a number of water swellable filaments 50 disposed in proximity to fiber tubes 30. As with cable 10 from FIG. 1, fiber tubes 30 and strength elements 40 are all located apart from the central axis.

It is understood that although two different examples are shown for exemplary purposes, the present invention contemplates any similar multi-tuber fiber optic cable having more than one fiber tube 30 that is constructed according to the following descriptions.

Figure 3:
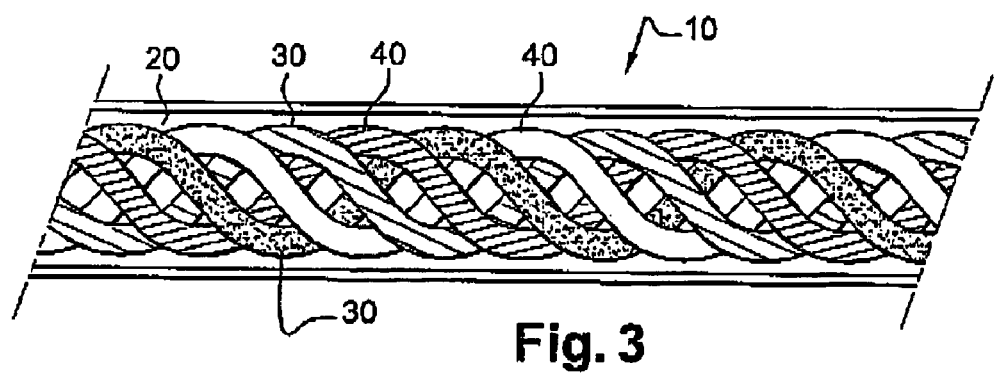
FIG. 3 is a cutaway side view, without the outer jacket, of the multi-tube fiber optic cable from FIG. 1, showing the fiber tubes in a helical arrangement, in accordance with one embodiment of the present invention.

In one embodiment of the present invention as illustrated in FIG. 3, a side view of cable 10 is shown with a portion of jacket 20 and filaments 50 removed. In this arrangement fiber tubes 30 and strength member 40 are rotated helically around the center axis of cable 10. As noted above, jacket 20 is pressure extruded onto fiber tubes 30 and strength members 40 such that all of the area within the outside diameter of jacket 20 that is not taken up by fiber tubes 30 and strength member 40 is taken up by the polymer used for jacket 20. As such, the helical arrangement of fiber tubes 30 and strength members 40 and their relative rate of twisting with relation to one another and jacket 20 is held constant or regular along the entire length of cable 10. The process for achieving this result is described in more detail below.

Figure 4:
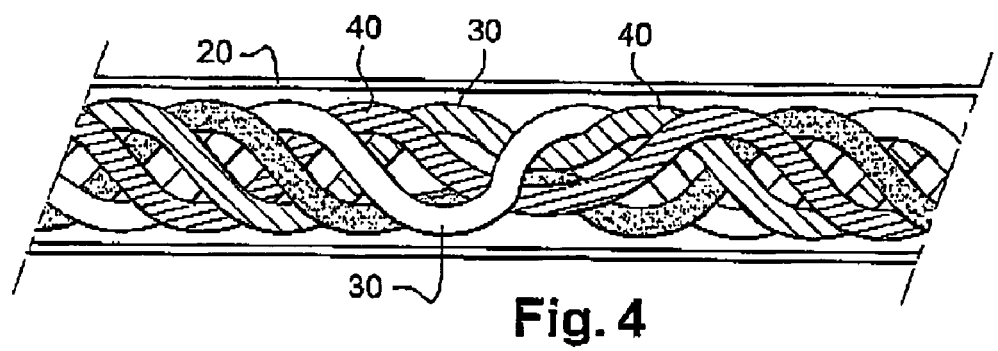
FIG. 4 is a cutaway side view, without the outer jacket, of the multi-tube fiber optic cable from FIG. 1, showing the fiber tubes in a helical arrangement, in accordance with one embodiment of the present invention.
Figure 5:
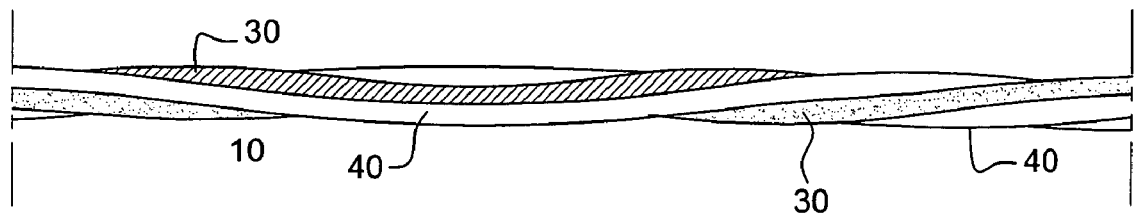
FIG. 5 is a side view without the outer jacket, of the multi-tube fiber optic cable, showing the fiber tubes in a helical arrangement, in accordance with one embodiment of the present invention.

In another embodiment of the present invention as illustrated in FIGS. 4 and 5, a side view of cable 10 is again shown with a portion of jacket 20 and filaments 50 removed. However, in this arrangement fiber tubes 30 and strength member 40 are oscillated around the center axis of cable 10 such that they first rotate in one direction (for example clockwise) and then after a set distance begin rotating back in the opposite direction (counterclockwise). This oscillation is repeated along the entire length of cable 10. FIG. 4 illustrates a cutaway of cable 10 shown with fiber tubes 30 in oscillated formation whereas, FIG. 5 simply illustrate the oscillated arrangement of fiber tubes 30 apart from the cable from different angles for a more clear illustration of the oscillation.

Again, it is noted that jacket 20 is pressure extruded onto fiber tubes 30 and strength members 40 such that all of the area within jacket 20 that is not taken up by fiber tubes 30 and strength member 40 is taken up by the polymer material used for jacket 20. As such, the continued oscillation arrangement of fiber tubes 30 and strength members 40 and their relative rate of twisting with relation to one another and jacket 20 is held constant or regular along the entire length of cable 10.

In this arrangement, cable 10 exhibits continually oscillated or helically formed fiber tubes 30 and strength members 40 that extend with a regularly patterned, non-center axis geometry for the length of cable 10. Furthermore, in this arrangement, fiber tubes 30 and strength members 40 do not require any additional supports or stranding fibers in order to maintain this regular geometry as the pressure extruded jacket, fills the open space within cable 10 and, when cool, is sufficiently sturdy to hold fiber tubes 30 and strength members 40 in place.

It is noted that although FIGS. 3–5 show the helical and oscillated arrangement of fiber tubes 30 and strength members 40 in relation to cable 10 from FIG. 1, it is understood that the same helical and oscillated arrangement are equally applicable to cable 100 described above and illustrated in FIG. 2. Furthermore, it is under stood that other forms of regular non-center axis geometry for fiber tubes 30 and strength members 40, held in place by pressure extruded jacket 20 are also within the contemplation of the present invention.

Figure 6:
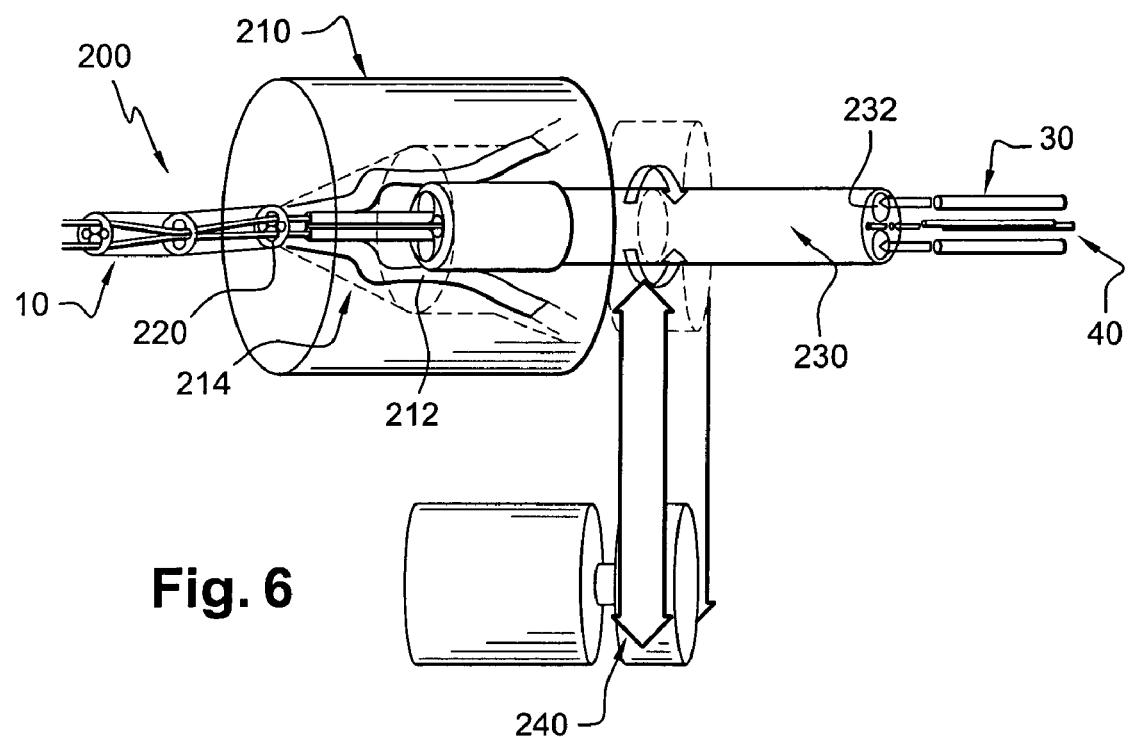
FIG. 6 is a side view of an apparatus for producing the multi-tube fiber optic cable as shown in FIG. 1, in accordance with one embodiment of the present invention.

Turning to the production of cables 10 and 100, in one embodiment of the present invention, as illustrated in FIG. 6, a diagram of a fiber optic cable manufacturing device 200. As illustrated in FIG. 6, device 200 comprises a pressure extrusion head 210, pressure extrusion die exit 220, a rotating guide member 230, guide member rotating driver unit 240.

In one embodiment of the present invention, device 200 is configured to receive fiber tubes 30 and strength members 40 at one end and to produce complete fiber optic cables 10 or cables 100 from the other end. To this end, device 200 maintains rotating guide member 230, preferably constructed of stainless steel, although other suitable metals or alloys may be used. Within rotating guide member 230, individual guide tubes 232 are held in place for receiving fiber tubes 30 and strength members 40 fed from their respective spools. Individual guide tubes 232 are arranged and sized according to the respective size of fiber tubes 30 and strength members 40 and their desired arrangement within completed cable 10.

Figure 2:
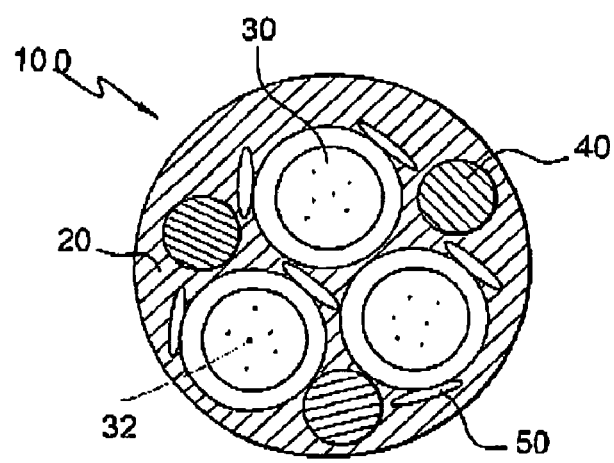
FIG. 2 is a cross section diagram of a multi-tube fiber optic cable in accordance with another embodiment of the present invention.

FIG. 6 illustrates rotating guide member 230 as having 4 individual guide tubes 232, suitable for producing a cable 10 as illustrated in FIG. 1. However, it is understood that this is by way of example only and any number of tubes, such as six individual guide tubes 232 used to form cable 100 as illustrated in FIG. 2, is also within the scope of the present invention.

Guide member rotating drive unit 240 is configured to rotate rotating guide member 230 according to the desired internal geometry of fiber tubes 30 and strength members 40 within the finished cable 10. For example, guide member rotating driver unit 240 may continuously rotate rotating guide member 230 in one direction in order to obtain an internal helical configuration for fiber tubes 30 and strength members 40 as shown in FIG. 3. Alternatively, guide member rotating driver unit 240 may rotate rotating guide member 230 in alternating directions, each for a predetermined amount of time, in order to obtain an internal oscillated configuration for fiber tubes 30 and strength members 40 as shown in FIGS. 4 and 5.

Other rotational or even fixed non-center axis geometries for guide member rotating driver unit 240 may also be used as desired. Furthermore, it is noted that guide member rotating driver unit 240 is shown as a separate unit from rotating guide member 230, however it is also within the contemplation of the present invention to incorporate rotating guide member 230 and guide member rotating driver unit 240 into a single unit.

In one embodiment of the present invention, as illustrated in FIG. 6, pressure extrusion head 210, maintains polymer inlet pipes 212, configured to guide the liquid form (heated) polymer used to form jacket 20 into alignment and into proximity with tubes 30 and strength elements 40 for extrusion.

As illustrated in FIG. 6, individual guide tubes 232 of rotating guide member 230 terminate in area directly behind and in close proximity to the end of polymer inlet pipes 212 and at an extrusion formation chamber 214 located directly behind pressure extrusion die exit 220. The proximity of guide tubes 232 and rotating guide member 230 to extrusion formation chamber 214 supports fiber tubes 30 and strength members 40 such that they can maintain their helical or oscillated geometry in formation chamber 214, even under the pressure of liquid polymer used for jacket 20. Rotating guide tubes 232 end just within extrusion formation chamber 214 just before the polymer exits extrusion head 210. The exact position of rotating guide tubes 232 within chamber 214 is determined by the stiffness of fiber tubes 30 and strength members 40 relative to the flowing melted plastic.

Thus, in one embodiment of the invention, as illustrated in FIG. 6, as fiber tubes 30 and strength members 40 are passed through formation chamber 214 and subsequently pulled out of pressure extrusion die exit 220, the helical or oscillated geometry of tubes 30 and strength members 40 is encased within the pressure extruded polymer of jacket 20. As polymer 20 quickly cools after exiting pressure extrusion head 210, the regular geometry of tubes 30 and strength members 40 is set without any significant distortion, resulting in cables 10 or cables 100 as indicated above in FIGS. 1 through 5. Further illustrated in FIG. 6, cable 10 exiting device 200 is shown with the rotating geometry in sequential cross sections similar to that shown in FIG. 1.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. A multi-tube fiber optic cable, said cable comprising:
   a plurality of fiber tubes, each of said fiber tubes containing at least one optical fiber therein, said plurality of fiber tubes being disposed apart from a central axis of said cable;
   a plurality of strength members, said strength members being disposed apart from a central axis of said cable; and
   an outer pressure extruded jacket surrounding said plurality of fiber tubes and said plurality of strength members, wherein said plurality of fiber tubes and said plurality of strength members are held in either one of an oscillated geometry and a helical geometry only by said pressure extruded jacket without the use of binding tapes or yarns.

2. The multi-tube fiber optic cable as claimed in claim 1, wherein said cable further comprises water swellable filaments disposed in close proximity to said plurality of fiber tubes.

3. The multi-tube fiber optic cable as claimed in claim 1, wherein said strength elements are any one of glass or aramid fiber reinforced plastic rods and glass or aramid fibers.

4. The multi-tube fiber optic cable as claimed in claim 1, wherein said outer jacket polymer is any of polyethylene (PE) and Poly vinyl chloride (PVC).

* * * * *